NONAMBIGUOUS READING SYSTEM FOR ANALOG TO DIGITAL CONVERTERS

Filed June 22, 1964 4 Sheets-Sheet 1

NONAMBIGUOUS READING SYSTEM FOR ANALOG TO DIGITAL CONVERTERS

Filed June 22, 1964

4 Sheets-Sheet 4

United States Patent Office 3,478,346
Patented Nov. 11, 1969

3,478,346

NONAMBIGUOUS READING SYSTEM FOR ANALOG TO DIGITAL CONVERTERS

Yasumasa Narukiyo, Nagoya, Japan, assignor to Okuma Machinery Works Ltd., Nagoya, Japan, a corporation of Japan Filed June 22, 1964, Ser. No. 376,689
Claims priority, application Japan, June 24, 1963, 38/33,318
Int. Cl. H03k 13/02
U.S. Cl. 340—347 4 Claims

ABSTRACT OF THE DISCLOSURE

Reading system free from ambiguity of reading at the boundary of two digits in which two n-digits code disks representing higher order digits and lower order digits are employed and three successive signals from said higher order code disk which generates signals, adjacent two signals of which partially overlap each other, and two signals generated from said lower order disk respectively representing any digits in the higher half and lower half of n-digits are fed to a logical circuit performing a particular logical operation.

This invention relates to reading systems of analog-to-digital converters for converting analog quantities, such as angles of rotation and so forth into digital quantities.

In general, a code disk, forming the main part of an analog-to-digital converter, is apt to effect many wrong readings at boundary positions of mutually adjacent digits on the code disk. Thus, by virtue of inevitable minor errors, such as caused by unevenness of end conditions of code disk and brushes and so forth, whether "9" or "0" is read is governed by chance, this resulting in numerous errors.

There have been various contrivances proposed for preventing errors, for example, greater than one digit. Particularly, there have been utilized a code disk of alternate binary code (Gray Code disk) and a special reading brush arrangement such as a dual brush system, V-brush system, and the like.

A primary object of the present invention is to provide a reading system of high precision, which is simple in construction and of low cost, preserving the advantages of the no-contact point technique of the prior art.

According to the present invention, a code disk capable of supplying signals of a requisite number of digits is employed for providing successively lapping signals with regard to time, which are introduced into a logic circuit satisfying a logic equation, $B=b.(Cr.\overline{a}+\overline{Cr}.\overline{bo}+bo.\overline{c})$, whereby the reading of a wrong signal is prevented.

Other objects and particularities of the present invention will be seen in the following detailed description of the invention, with reference to the accompanying drawings, in which.

Figure 1:
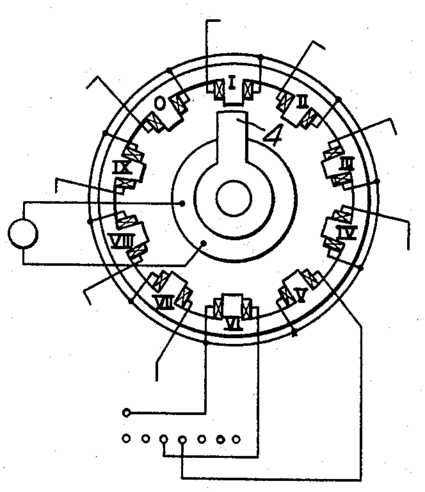
FIG. 1 shows, in elevation, a non-contact type code plate or disk embodying the present invention.

Let us consider a code disk for providing 10 decimal digits per revolution of the disk shaft. If two such disks are used, and the rotating shafts are coupled together with a gear ratio of 10:1, the input shaft can provide 100 digits. In this case, when the lower order shaft is at the boundary between "9" and "0," the higher order shaft should be at the boundary between adjacent digits, and the change of the higher order shaft by one digit and the change of the lower order shaft from "9" to "0" should be coincident in position with regard to time. However, it is generally impossible to accomplish this coincidence by reason of mechanical inaccuracy, and wrong signals are apt to occur. For example, an incorrect reading of "17," "18," "19," "$\underline{1}0$," "20," "21," can be effected on rotation of the input shaft.

The present invention prevents such an error from occurring. Thus, referring to FIGS. 1 and 2, the code disk shown comprises a stator 6 carrying uniformly spaced magnetic poles 1 around the outer periphery, the poles extending inwardly towards the center of disk.

Each pole 1 carries a secondary coil 2 wound thereon. The stator 6 also has a boss around which a primary coil 3 is wound. A rotating shaft 5 rotatably passes through the boss of stator 6 and carries a rotating magnetic piece 4 fixed to the shaft, and having a circumferential width larger than that of each pole 0, I, II, III.

Figure 2:
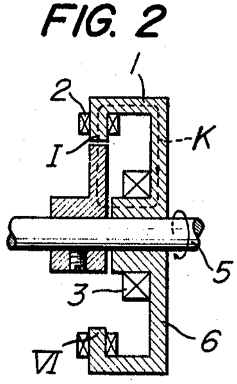
FIG. 2 is a longitudinal sectional view of the disk shown in FIG. 1.
Figure 3:
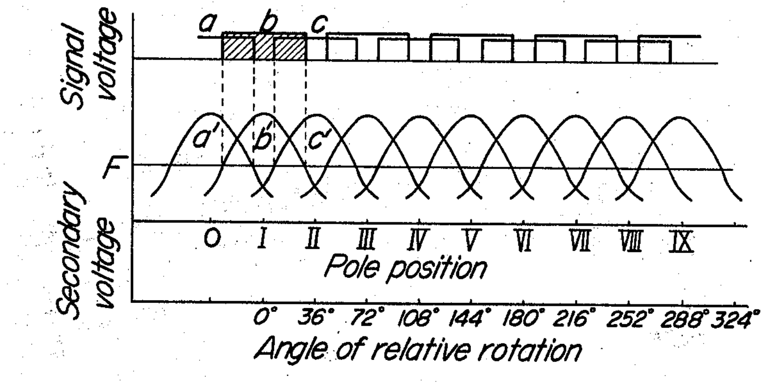
FIG. 3 is a graph showing the relation between angle of relative rotation of the disk and secondary voltage induced therein.

When the primary coil 3 is energized and the shaft 5 is rotated, with the magnetic piece 4 successively passing in front of poles 1, each carrying secondary coil 2, with a magnetic circuit K (FIG. 2) completed and opened successively, voltages are successively induced in secondary coils 2 as shown in FIG. 3 by $a'$, $b'$, $c'$ . . . which lap one another with respect to time.

These voltages are introduced into a shaping circuit, such as a Schmitt trigger circuit, to provide successively lapping signals $a$, $b$, $c$ . . . , as shown in the upper portion of FIG. 3, with line F as the operating point. These signals are introduced into the logical circuit shown in FIG. 6.

Figure 6:
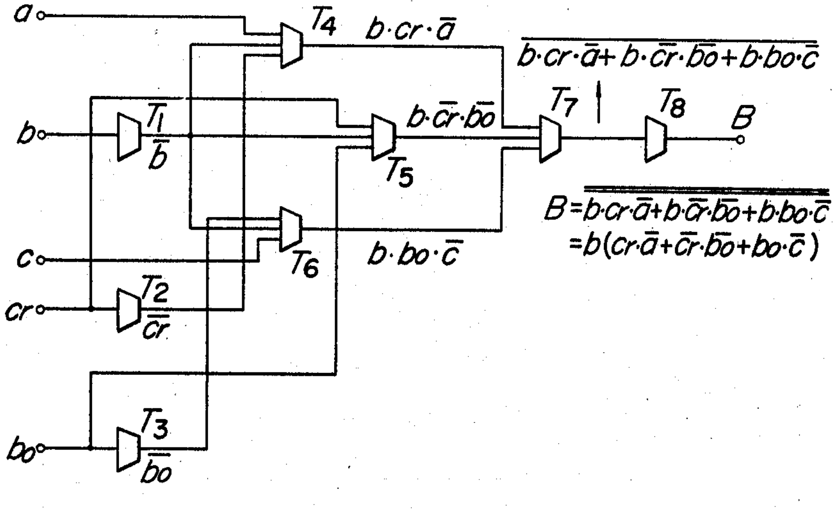
FIG. 6 is a block diagram of the logical circuit according to the invention.

The logical circuit of FIG. 6, which performs the logical operation $B=b.(C_r.\overline{a}+\overline{C}_r.\overline{b}_0+b_0.\overline{c})$, comprises NOR circuits $T_1$, $T_2$, $T_3$, $T_4$, $T_5$, $T_6$, $T_7$ and $T_8$. The NOR circuit is a circuit in which, when a signal $a$ is received as an input signal, the circuit delivers a signal $\overline{a}$ as an output signal, and when the input signal is $a$, $b$, and $c$, its output is $\overline{a+b+c}$, i.e. $\overline{a}.\overline{b}.\overline{c}$. In other words, the NOR circuit is the combination of a NOT circuit and an OR circuit. The symbols $a$, $b$, and $c$ represent any successive digital signals such as 0, 1, 2; 5, 6, 7; 9, 0, 1, and the like which are obtained by shaping the output of each pole of the higher order code disk as shown in FIG. 3, whereas the symbols $\overline{a}$, $\overline{b}$, and $\overline{c}$ represent inverted signals thereof. $C_r$ and $b_0$ represent signals from the lower code disk which will hereinafter be referred to as carry signals for the sake of convenience. $C_r$ can be a signal generated when the magnetic piece 4 passes a pole of the lower code disk according to any one of successive digits including 9 taken from 5 to 9, for example 6789, and $b_0$ can be that of successive digits including 0 taken from 0 to 4, for example 0123. However, it is preferable to take 56789 and 01234 for $C_r$ and $b_0$ signal generation, respectively, because this selection enables to make tolerance of the coupling error of the higher order digits and the lower order digits larger. $\overline{C}_r$ and $\overline{b}_0$ represent inverted signals of $C_r$ and $b_0$.

Figure 7:
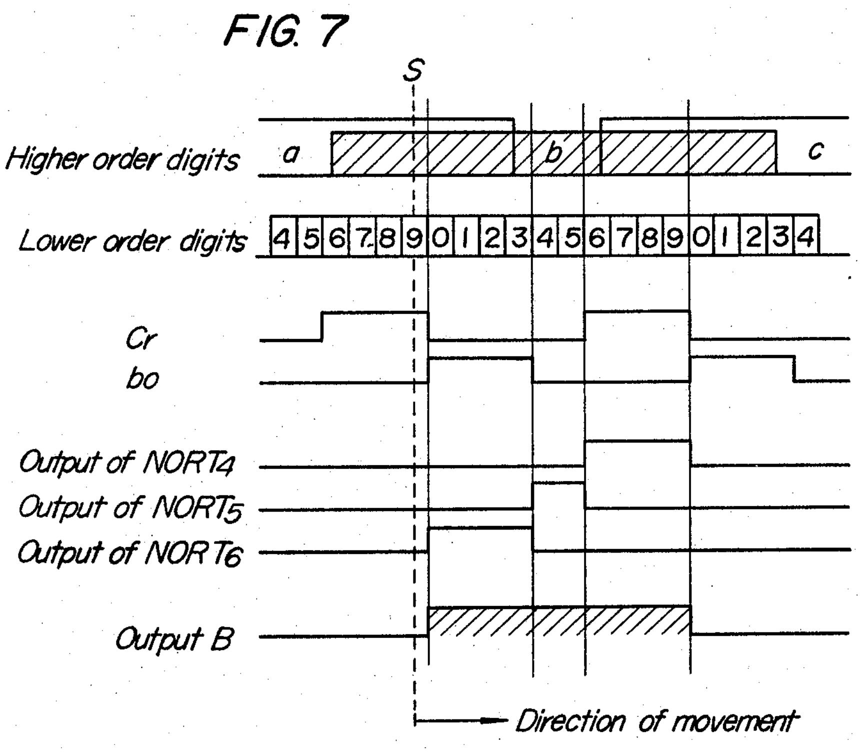
FIG. 7 shows wave forms at various parts of the logical circuit of FIG. 6.

Now, referring to FIGS. 1 and 3, if the outputs of the poles 0, I and II of the higher order A–D converter are taken to be $a$, $b$, and $c$, respectively, and if the carry signals $C_r$ and $b_0$ are arranged to be generated when the lower order A–D converter outputs are 6 to 9 and 0 to 3, respectively, the wave shape of each part of the logical circuit of FIG. 6 which is reading out the ouput signal of the pole I varies as shown in FIG. 7 when the movable piece 4 moves in the increasing number direction.

In FIG. 7, character S represents the position of the movable piece 4 of the higher order A–D converter. If it is assumed that the output of the lower order A–D converter is 9, the higher order converter is delivering both signals *a* and *b*. The aforementioned logical equation $B=b.(C_r.\overline{a}+\overline{C}_r.\overline{b}_0+b_0\cdot\overline{c})$ is the logical equation for reading out the output *b* of the higher order converter. Since the signal $C_r$ as well as the signal *a* is being delivered at the position S, the Equation B is not satisfied. When the movable piece 4 moves in the increasing number direction and the lower order digit changes from 9 to 0, the signal $C_r$ disappears, but instead the signal $b_0$ appears. Consequently, $b.b_0.\overline{c}$ of the NOR circuit $T_6$ is satisfied resulting in the generation of the signal B. If the movable piece moves further and the lower order digit changes from 3 to 4, the signal $b_0$ disappears, and hence the term $b.b_0.\overline{c}$ is no longer satisfied. However, since $b.\overline{C}_r.\overline{b}_0$ of the NOR circuit $T_5$ is satisfied, the signal B is maintained. If the lower order digit changes from 5 to 6 as a result of a further movement of the movable piece, the term $b.\overline{C}_r.\overline{b}_0$ is no longer satisfied, but instead $b.C_r.a$ of the NOR circuit $T_4$ is satisfied, and hence the signal B is still maintained. However, if the lower digit changes from 9 to 0 with a further movement of the movable piece, all the terms of the logical equation are no longer satisfied, and hence the signal B disappears. Thus, the logical equation of the signal B is satisfied when the lower order digit is from 0 to 9 within the region of the higher order signal *b*, and hence the output signal B of the logical circuit of FIG. 6 exactly represents the position of the pole I of the higher order converter.

FIG. 6 shows the logical circuit for reading out the signal of the pole I of the higher order A–D converter. For decimalism, the position of each pole of the higher order A–D converter can be axactly read out by employing ten such circuits as shown in FIG. 6.

Figure 8:
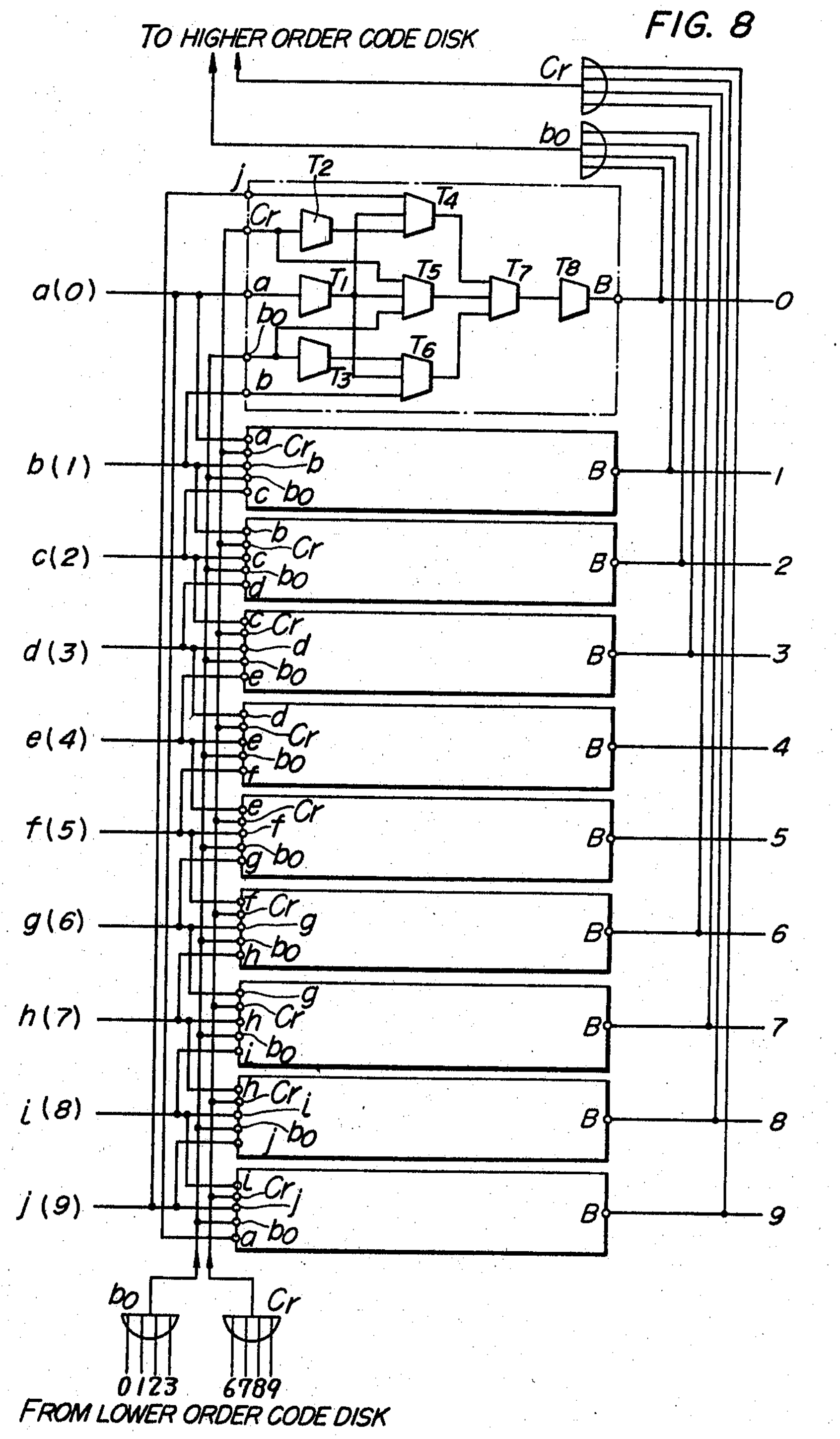
FIG. 8 is a block diagram of a logical circuit according to the invention for a decimal code disk.

FIG. 8 shows such a logical circuit for a decimal converter disk. In FIG. 8, lower left input terminals 0 . . . 3 and 6 . . . 9 are merely connected through respective shaping circuits to the corresponding poles of the lower (or the lowest when more than two code disks are employed) order code disk, respectively. Upper left output terminals $C_r$ and $b_0$ are connected to input terminals $C_r$ and $b_0$, respectively, of the similar logical circuit for the next higher order code disk when more than two code disks are employed, at which time one thousand or more digits are available. Input terminals *a* . . . *j* are connected to the poles of the higher order code disk corresponding to digits 0 . . . 0, respectively through respective shaping circuits.

When the carry signals $C_r$ and $b_0$ satisfy the condition $C_r=\overline{b}_0$, the above mentioned logical equation becomes $B=b(C_r.\overline{a}+\overline{C}_r.c)$. Thus, by employing the carry signals $C_r$ and $b_0$, the tolerance of the coupling of the lower order and the higher order digits can be made great. This is one of the outstanding features of the invention.

Figure 4:
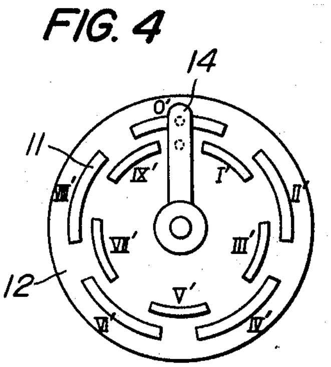
FIG. 4 shows, in elevation, a contact type code disk embodying the invention.
Figure 5:
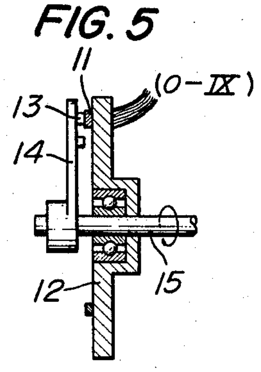
FIG. 5 is a longitudinal sectional view of the disk shown in FIG. 4.

Referring to FIGS. 4 and 5, when a contact type code disk 12 is shown, a decimal code disk 12 may be such that the circle is divided circumferentially into 10 parts, with conductors 11 of 36 degree spacing for one digit, lapping one another by 18 degrees, and insulated from one another by about a 54 degree width. The disk 12 carries a central shaft 15 rotatably, which in turn carries a movable piece 14 having contact brushes 13 fixed to the outer end thereof. When the movable piece 14 is rotated with brushes 13 engaging conductors 11 successively, the signals from respective conductors are "on" and "off" signals, the same as shown in FIG. 3. These signals are applied to the logic circuit of FIG. 6, and B signals are obtained from the output terminal just as in the first embodiment shown in FIGS. 1 and 2.

With the above-mentioned construction of the present invention, there is no danger of erroneous reading, and no limit to number of digits which can be employed. The invention is particularly useful for decimalism and is not limited to "on" and "off" types of signalling.

According to experiments, the width of each digit may vary by ±20%, without affecting the operation. Particularly for non-contact types of reading, there are no sliding parts that would affect the useful life and, moreover, high speed reading is possible.

What is claimed is:

1. An apparatus for reading digits from an analog-to-digital converter, comprising: at least two n-digits notation code disks, *n* being larger than two, and *n* logical circuits, the *l*th circuit of which performs the logical operation $L=l.(C_r.\overline{l-1}+\overline{C}_r.\overline{l}_0+\overline{l}_0.l.\overline{l+1}$ where L is the signal corresponding to any digit signal *l* generated from the higher order code disk of successive two code disks of said at least two n-digits notation code disks, $C_r$ is a carry signal generated when one signal included in said upper group of output signals from said lower order code disk of said two code disks appears, and $l_0$ is a carry signal generated when one signal included in the lower group of outputs from said lower order code disk appears, said outputs of said lower order code disk being divided into said upper and lower groups.

2. An apparatus for reading digits according to claim 1 in which said n-digits notation code disks include means for decimal notation.

3. Apparatus as claimed in claim 2 wherein said logical circuits include $C_r$ and $l_0$ input terminals for respectively receiving one of the signals corresponding to digits 6, 7, 8 and 9 and one of the signals corresponding to digits 0, 1, 2 and 3 from said lower order code disk and input terminals $l-1$, $l$ and $l+1$ for respectively receiving three successive digit signals for said higher order code disk, first, second and third NOR circuits respectively coupled to said $l$, $C_r$ and $l_0$ input terminals, a fourth NOR circuit coupled to said $l-1$ input terminal and said first and second NOR circuits, a fifth NOR circuit coupled to said first NOR circuit and to said $C_r$ and $l_0$ input terminals, a sixth NOR circuit coupled to said first and third NOR circuits and to said $l+1$ input terminal, and a seventh NOR circuit coupled to said fourth, fifth and sixth NOR circuits.

4. Apparatus as claimed in claim 3 comprising an eighth NOR circuit coupled to said seventh NOR circuit.

References Cited

UNITED STATES PATENTS

| | | | |
|---|---|---|---|
| 2,873,440 | 2/1959 | Speller | 340—347 |
| 2,972,740 | 2/1961 | Lahti | 340—347 |
| 3,047,855 | 7/1962 | Wolinsky | 340—347 |
| 3,130,399 | 4/1964 | Paul | 340—347 |
| 3,175,210 | 5/1965 | Wolinsky | 340—347 |

MAYNARD R. WILBUR, Primary Examiner

C. D. MILLER, Assistant Examiner